United States Patent [19]

Sakamoto et al.

[11] Patent Number: 4,585,979
[45] Date of Patent: Apr. 29, 1986

[54] THREE-PHASE BRUSHLESS MOTOR HAVING AUXILIARY MAGNETIC POLE ON ROTOR

[75] Inventors: Satoshi Sakamoto, Tokyo; Mitsuo Uzuka, Atsugi, both of Japan

[73] Assignee: Sony Corporation, Tokyo, Japan

[21] Appl. No.: 654,004

[22] PCT Filed: Dec. 28, 1983

[86] PCT No.: PCT/JP83/00463
§ 371 Date: Sep. 12, 1984
§ 102(e) Date: Sep. 12, 1984

[87] PCT Pub. No.: WO84/02810
PCT Pub. Date: Jul. 19, 1984

[30] Foreign Application Priority Data

Jan. 14, 1983 [JP] Japan .................................. 58-4517

[51] Int. Cl.⁴ ............................................. H02K 29/08
[52] U.S. Cl. .................................. 318/254; 318/138; 318/439; 310/68 R
[58] Field of Search .................. 318/138, 254, 439; 310/68 R

[56] References Cited

U.S. PATENT DOCUMENTS

| | | | |
|---|---|---|---|
| 4,025,835 | 5/1977 | Wada | 318/254 A |
| 4,039,912 | 8/1977 | Wada | 318/254 A |
| 4,217,508 | 8/1980 | Uzuka | 310/46 |
| 4,354,145 | 10/1982 | Janssen | 318/254 |
| 4,405,885 | 9/1983 | Okamoto | 318/138 X |

Primary Examiner—Vit W. Miska
Assistant Examiner—Bentsu Ro
Attorney, Agent, or Firm—Lewis H. Eslinger; Alvin Sinderbrand

[57] ABSTRACT

The present invention relates to a three-phase brushless motor in which two electromagnetic transducer elements for detecting the rotation position of a rotor having a plurality of magnetized regions are disposed to have a relative positional relation with an electrical angle of 120° or 240°, a composed signal having a phase difference of 120° relative to the output signals from the electromagnetic transducer elements is provided and the drive current to be supplied to the stator coil is determined on the basis of the composed signal and the output signals from the electromagnetic transducer elements. An auxiliary magnetic pole having opposite polarity to that of main magnetic pole is disposed on the rotor at the portions near and opposing to the electromagnetic transducer elements so as to make the waveform of the composed signal of the output signals from the electromagnetic transducers steep at zero-cross points. Thus, the drive currents supplied to the stator coils are made excellent and uneven rotation torque can be improved.

7 Claims, 28 Drawing Figures

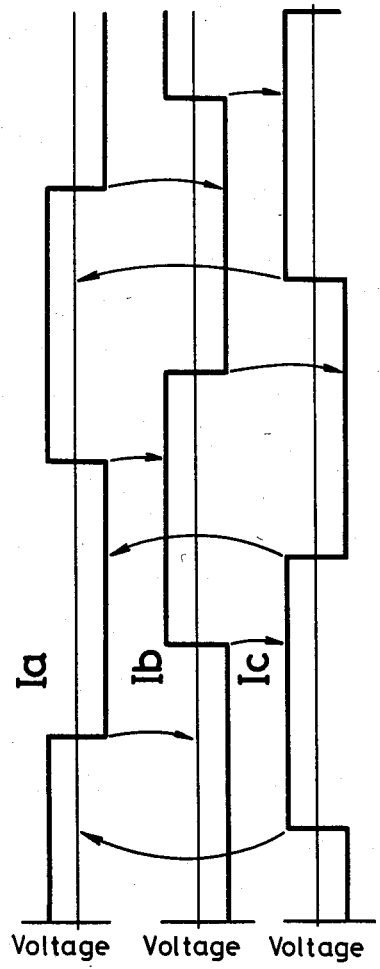
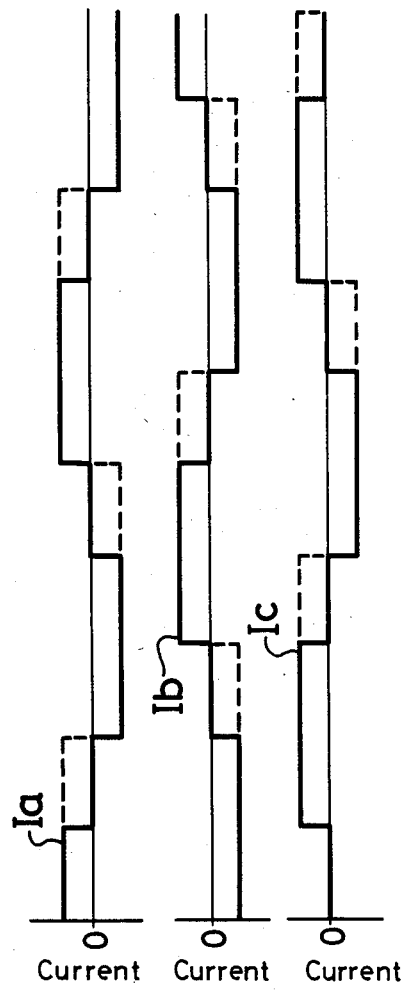
FIG. 5A
FIG. 5B
FIG. 5C
FIG. 5D
FIG. 5E
FIG. 5F

THREE-PHASE BRUSHLESS MOTOR HAVING AUXILIARY MAGNETIC POLE ON ROTOR

DESCRIPTION

Technical Field

So far flat and small three-phase brushless motor has been proposed as shown in FIG. 1. In FIG. 1, reference numeral 1 designates a stator, 2 a rotor and 3 a rotary shaft. This stator 1 comprises six flat stator coils $L_1$, $L_2$ ... $L_6$ which are disposed on a base plate 4 of nearly circular shape with an equal angular range, for example, an angular range of 60° as shown in FIG. 2. In this case, a pair of opposing stator coils $L_1$ and $L_4$; $L_2$ and $L_5$; and $L_3$ and $L_6$ are respectively connected in series or in parallel to each other. The rotor 2 is formed of a magnet of disk shape in which eight poles of N poles and S poles are alternately magnetized with an equal angular range as, for example, shown in FIG. 3. Further, electromagnetic transducer elements, for example, Hall elements $H_1$, $H_2$ and $H_3$ are respectively disposed on the base plate of the stator 1 at its predetermined position, for example, at the intermediate position between the stator coils $L_6$ and $L_1$, at the intermediate position between the stator coils $L_1$ and $L_2$ and at the intermediate position between the stator coils $L_2$ and $L_3$ on the external peripheral portion of the base plate of the stator 1. In this case, although the geometrical angle between adjacent Hall elements $H_1$, $H_2$ and $H_3$ is 60°, since the rotor 2 includes 8 poles, the Hall elements are disposed with a relative positional relation of an electrical angle of 240°.

As shown in FIG. 4, each of the Hall elements $H_1$, $H_2$ and $H_3$ is connected between a voltage source terminal 5 and the ground. The output signals from the Hall elements $H_1$, $H_2$ and $H_3$ are respectively supplied to a control signal generating circuit 6 which is formed of a semiconductor integrated circuit. The six output terminals of the control signal generating circuit 6 are respectively connected to bases of npn-transistors 7a, 7b, 8a, 8b, 9a and 9b. The collectors of the respective transistors 7a, 8a and 9a are connected together to a voltage source terminal 10 to which a positive D.C. voltage is supplied. The emitters of the transistors 7a, 8a and 9a are respectively connected to the collectors of the transistors 7b, 8b and 9b and the emitters of these transistors 7b, 8b and 9b are respectively grounded. The connection point between the emitter of the transistor 7a and the collector of the transistor 7b is connected through a series circuit formed of a series circuit of the stator coils $L_1$ and $L_4$ and a series circuit of the stator coils $L_5$ and $L_2$ to the connection point between the emitter of the transistor 8a and the collector of the transistor 8b. While, the connection point between the stator coils $L_4$ and $L_5$ is connected through a series circuit of the stator coils $L_6$ and $L_3$ to the connection point between the emitter of the transistor 9a and the collector of the transistor 9b. In this case, when the Hall elements $H_1$, $H_2$ and $H_3$ produce at their output terminals square wave signals having phases each of which is sequentially different from one another by an electrical angle of 240° as shown in FIGS. 5A, 5B and 5C, if a current flowing through the series circuit of the stator coils $L_1$ and $L_4$ is taken as Ia, a current flowing through the series circuit of the stator coils $L_2$ and $L_5$ as Ib and a current flowing through the series circuit of the stator coils $L_3$ and $L_6$ as Ic, the control signal generating circuit 6 is so formed that it generates control signals such that, as shown in FIGS. 5D, 5E and 5F, these currents Ia, Ib and Ic have different phases by 120° each and each of them becomes a positive current during 120° of the electrical angle, a zero current during the succeeding 60° of the electrical angle, a negative current during the succeeding 120° of the electrical angle and a zero current during the succeeding 60° of the electrical angle, respectively, which is repeated sequentially.

Since such prior art three-phase brushless motor requires the three Hall elements $H_1$, $H_2$ and $H_3$, there occurs such a problem that the number of wires for interconnecting the Hall elements with a drive circuit is large and the power for driving the Hall elements can not be neglected in view of saving a power consumption. Further, when the motor is miniaturized, it is difficult to position the Hall elements with high precision and the space for disposing the Hall elements is reduced. Thus, it is not desirable to provide three Hall elements as in the prior art.

Therefore, as shown in FIG. 6, a three-phase brushless motor is previously proposed in which two electromagnetic transducer elements, for example, two Hall elements $H_1$ and $H_2$ for detecting the rotation position of the rotor 2 are respectively disposed with a relative positional relation having an electrical angle of 120° or 240° and the output signals of the electromagnetic transducer elements $H_1$ and $H_2$ are composed with each other to thereby produce a composed signal having a phase difference of 120° relative to the output signals of the electromagnetic transducer elements $H_1$ and $H_2$ so that on the basis of the composed signal and the output signals from the electromagnetic transducer elements $H_1$ and $H_2$, the drive currents are supplied to the stator coils $L_1$, $L_2$ ... $L_6$. In the example shown in FIG. 6, the stator 1 and the rotor 2 are formed similarly to those shown in FIGS. 2 and 3, in which of the Hall elements $H_1$, $H_2$ and $H_3$ as shown in FIG. 2, the Hall element $H_3$ is removed, while the two Hall elements $H_1$ and $H_2$ are provided. In this case, each of the Hall elements $H_1$ and $H_2$ is disposed to have a relative positional relation with an electrical angle of 240°. The D.C. voltage from the voltage source terminal 5 is supplied through a resistor 11 to the Hall elements $H_1$ and $H_2$ as the bias voltage thereof, and the output signals produced at one and the other output terminals $a_1$ and $a_2$ of the Hall element $H_1$ are supplied to first and second input terminals of the control signal generating circuit 6, while the output signals produced at one and the other output terminals $b_1$ and $b_2$ of the Hall element $H_2$ are supplied to third and fourth input terminals of the control signal generating circuit 6. Between the one output terminal $a_1$ of the Hall element $H_1$ and the one output terminal $b_1$ of the Hall element $H_2$ is connected a series circuit which is formed of two resistors 12 and 13, each resistor having an equal resistance value R. The connection point between the resistors 12 and 13 is connected to a sixth input terminal of the control signal generating circuit 6. On the other hand, between the other output terminal $a_2$ of the Hall element $H_1$ and the other output terminal $b_2$ of the Hall element $H_2$ is connected a series circuit which is formed of two resistors 14 and 15, each resistor having an equal resistance value R. The connection point between the resistors 14 and 15 is connected to a fifth input terminal of the control signal generating circuit. In this case, the resistance value R of each of the resistors 12, 13, 14 and 15 is selected extremely larger than those of the Hall elements $H_1$ and $H_2$. Further, in this case, if the values of the output voltage produced at one and the other output terminals $a_1$ and $a_2$ of the Hall element $H_1$ are respectively taken as $Va$ and $Va'$ and the values of the output voltages produced at one and the other output terminals $b_1$ and $b_2$ of the Hall element $H_2$ are respectively taken as $Vb$ and $Vb'$, a voltage value $Vc$ applied to the fifth input terminal of the control signal generating circuit 6 is expressed as $$Vc = \tfrac{1}{2}(Va' + Vb')$$

and a voltage value $Vc'$ applied to the sixth input terminal of the control signal generating circuit is expressed as $$Vc' = \tfrac{1}{2}(Va + Vb)$$

Thus, an input signal c between the fifth and sixth input terminals is given as $$c = Vc - Vc' = -\tfrac{1}{2}(Va - Va') - \tfrac{1}{2}(Vb - Vb')$$

An input signal between the first and second input terminals, namely, an output signal a of the Hall element $H_1$ is given as $$a = Va - Va'$$

and an input signal between the third and fourth input terminals, namely, an output signal b of the Hall element $H_2$ is given as $$b = Vb - Vb'$$

Thus, $$c = -\tfrac{1}{2}(a + b)$$

Accordingly, the detecting signals such as shown in FIGS. 5A, 5B and 5C are respectively supplied to the input terminals of the control signal generating circuit 6. In FIG. 6, the other circuit portions are constructed similarly to those of FIG. 4 so that by the circuit shown in FIG. 6, the rotor 2 can be rotated similarly to that shown in FIG. 4.

According to the example shown in FIG. 6, the number of the Hall elements can be reduced from three to two, the number of the wires for interconnecting the Hall elements with the drive circuit can be reduced and the power consumption can also be reduced, which facts are advantageous for miniaturizing the motor.

However, when as the rotor 2 of the above three-phase brushless motor, such one in which the N poles and the S poles are alternately magnetized with the equal angular spacing as shown in FIG. 3 is used and this rotor 2 is rotated, the waveforms of the output signals from the Hall elements $H_1$ and $H_2$ become such ones having saturated flat tops as shown by curves $S_1$ and $S_2$ in FIG. 7A. As a result, a waveform $S_3$ of the composed signal c, which is provided by composing the waveforms $S_1$ and $S_2$, has a very gentle inclination at zero-cross points as shown in FIG. 7A so that the zero-cross points can not be determined precisely. Thus a composed signal c as shown in FIG. 7c being applied between the fifth and sixth input terminals of the control signal generating circuit 6. The composed signal c shown in FIG. 7C is such one that the phases of the falling edges and the rising edges of the square wave are displaced from the normal phases by $\tau_1, \tau_2, \tau_3 \ldots$ FIGS. 7B and 7D respectively show waveforms which are obtained from the output signals $S_1$ and $S_2$ of the Hall elements $H_1$ and $H_2$. When the signals as shown in FIGS. 7B, 7C and 7D are respectively supplied to the input terminals of the control signal generating circuit 6 so as to produce the drive currents which are supplied to the stator coils $L_1, L_2 \ldots L_6$ and the rotor 2 is rotated by such drive currents, the uneven rotation torque thereof becomes large near the zero-cross points of the composed signal $S_3$ as shown in FIG. 7E. Then, there is a defect that a ripple becomes, for example, 23.4% or above. In view of the above aspect, the present invention is to improve uneven rotation torque of a three-phase brushless motor which uses two electromagnetic transducer elements.

DISCLOSURE OF INVENTION

The present invention is to provide a three-phase brushless motor in which two electromagnetic transducer elements for detecting the rotation position of a rotor having a plurality of magnetized areas are disposed to have a relative positional relation with an electrical angle of 120° or 240°, a composed signal having a phase difference of 120° relative to the output signals from the electromagnetic transducer elements is produced, and the drive currents supplied to stator coils are determined by the composed signal and the output signals from the electromagnetic transducer elements. In such a three-phase brushless motor, an auxiliary magnetic pole having opposite polarity to that of the main magnetic pole is disposed on the rotor at a portion near and opposing to the electromagnetic transducer elements so as to make the waveform of the composed signal of the output signals from the electromagnetic transducer elements steep at zero-cross points of the waveform of the composed signal. As a result, the drive currents supplied to the stator coils are made satisfactory whereby to improve the uneven rotation torque of the rotor.

BRIEF DESCRIPTION OF DRAWINGS

FIGS. 5A–5F, 7A–7E, 9A–9E, 11A–11B are respectively diagrams useful for explaining the present invention.

BEST MODE FOR CARRYING OUT THE INVENTION

Figure 3:
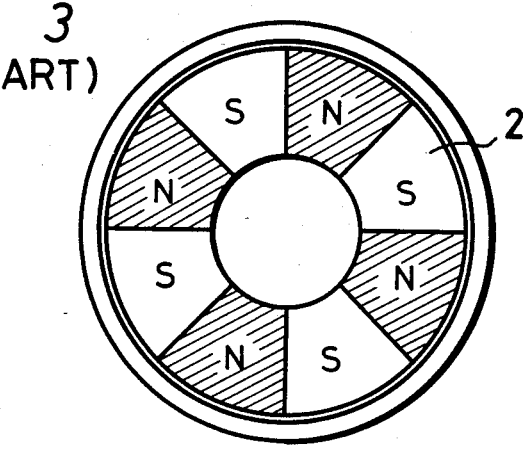
FIG. 3 is a plan view showing an example of a prior art rotor.
Figure 4:
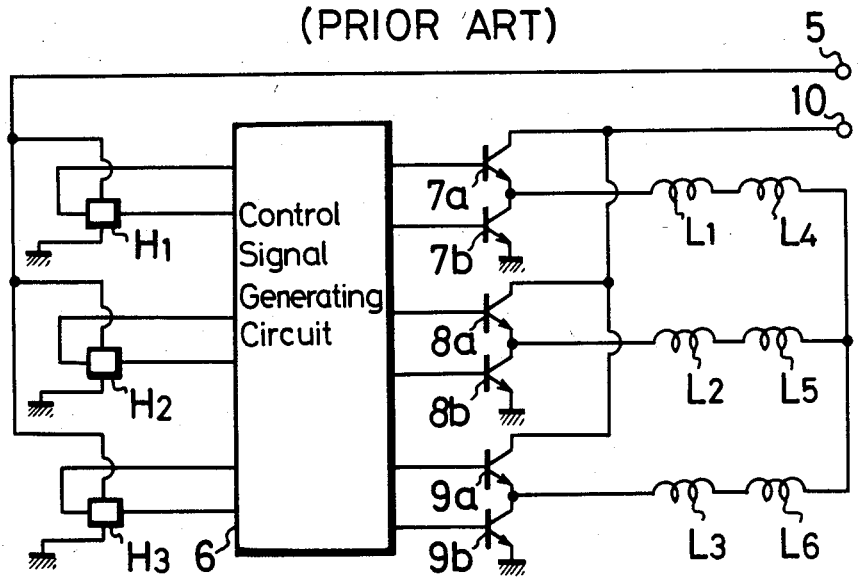
FIGS. 4 and 6 are respectively diagrams showing examples of a drive current supplying circuit.
Figure 8:
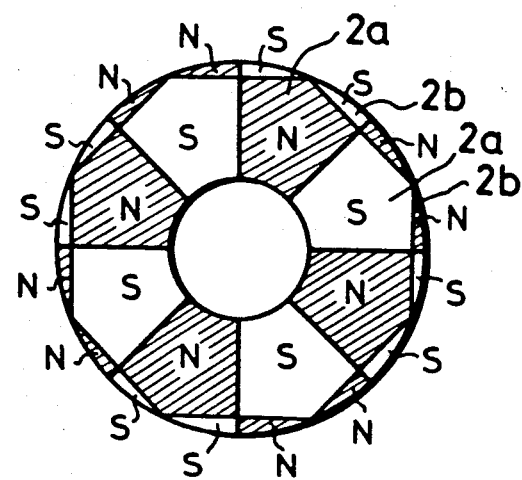
FIG. 8 is a plan view showing an example of a rotor used in an embodiment of a three-phase brushless motor according to the present invention.

An embodiment of a three-phase brushless motor according to the present invention will hereinafter be described with reference to FIG. 8. In FIG. 8, like parts corresponding to those in FIG. 3 are marked with the same references and their detailed description will be omitted.

Figure 1:
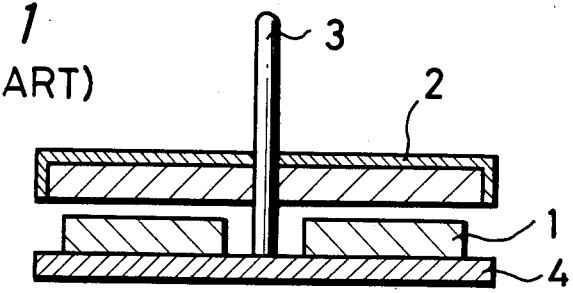
FIG. 1 is a cross-sectional view showing an example of a three-phase brushless motor of a flat type.
Figure 2:
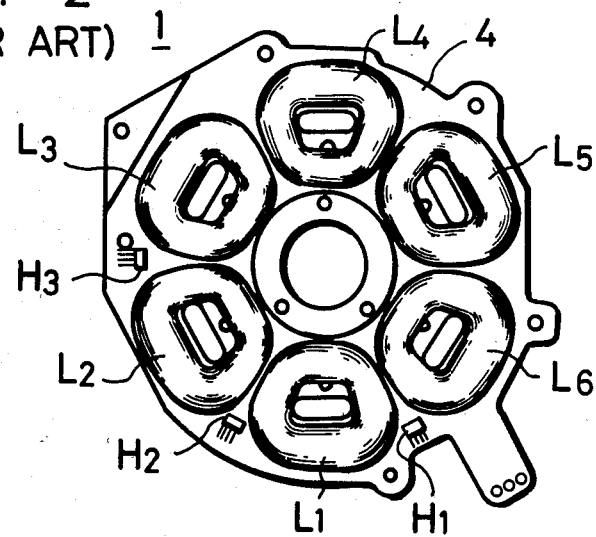
FIG. 2 is a plan view showing an example of a prior art stator.
Figure 6:
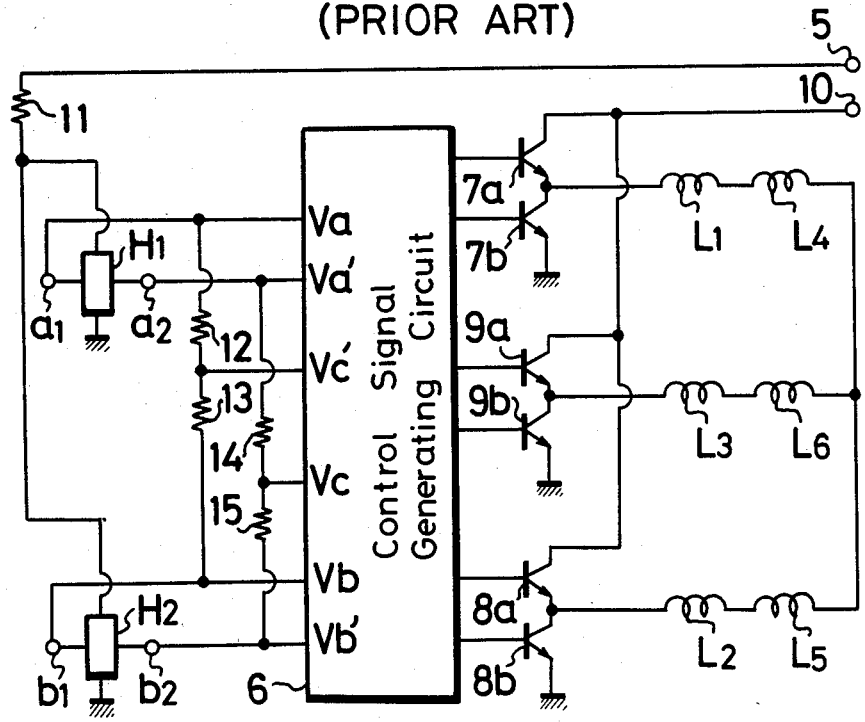
Figures 7A, 7B, 7C, 7D, 7E:
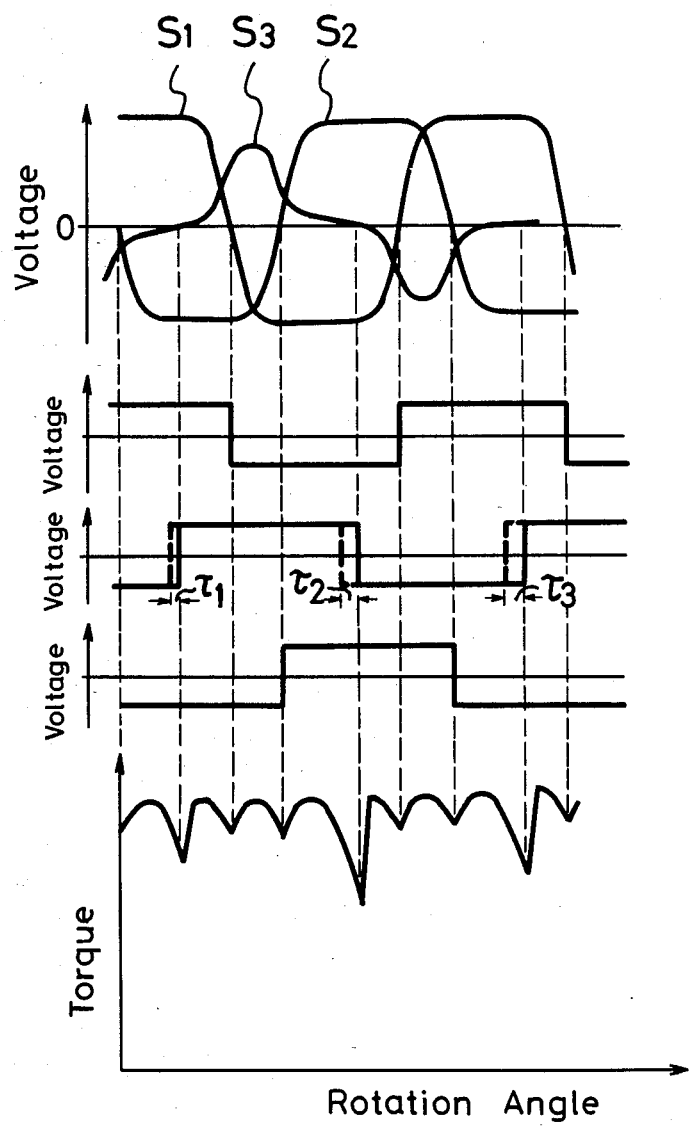

In this embodiment, the stator 1 is formed such that as shown in FIG. 2, six flat stator coils $L_1, L_2 \ldots L_6$ are disposed on the base plate 4 of substantially circular shape with an equal angular range, for example, an angular range of 60°. In this case, the opposing stator coils $L_1$ and $L_4$; $L_2$ and $L_5$; and $L_3$ and $L_6$ are respectively coupled serially or parallelly to each other. Further, the electromagnetic transducer elements, for example, Hall elements $H_1$ and $H_2$ are respectively disposed at predetermined positions of the stator 1, for example, at the intermediate position between the stator coils $L_6$ and $L_1$ and at the intermediate position between the stator coils $L_1$ and $L_2$ in the external peripheral portion of the stator 1. In this case, each of the Hall elements $H_1$ and $H_2$ are disposed to have a relative positional relation with an electrical angle of 240°. In this embodiment, the connection relation among the Hall elements $H_1$, $H_2$ and the stator coils $L_1, L_2 \ldots L_6$ is made the same as that in FIG. 6.

In this embodiment, the rotor 2 is constructed as shown in FIG. 8. That is, the rotor 2 is formed such that, for example, eight poles of N poles and S poles are alternately magnetized on a disk made of magnetic material with an equal angular spacing as main magnetic poles 2a and auxiliary magnetic poles 2b having opposite polarities to those of the main magnetic poles 2a are magnetized on the disk at its external peripheral portions defined by connecting adjacent intermediate points of the eight main magnetic poles 2a. In this case, the auxiliary magnetic poles 2b of the rotor 2 are arranged to substantially pass over the electromagnetic transducer elements $H_1$ and $H_2$ of the stator.

In this embodiment, similarly to the previously proposed three-phase brushless motor using two Hall elements $H_1$ and $H_2$, the two Hall elements $H_1$ and $H_2$ for detecting the rotation position of the rotor 2 are disposed to have a relative positional relation with an electrical angle of 240°, the output signals from the Hall elements $H_1$ and $H_2$ are composed to each other so as to produce a composed signal which has a phase difference of 120° relative to the output signals from the Hall elements $H_1$ and $H_2$, and the composed signal and the output signals from the Hall elements $H_1$ and $H_2$ are used to determine the drive currents which will be fed to the stator coils $L_1, L_2 \ldots L_6$. Thus, it is possible to rotate the three-phase brushless motor.

Figures 9A, 9B, 9C, 9D, 9E:
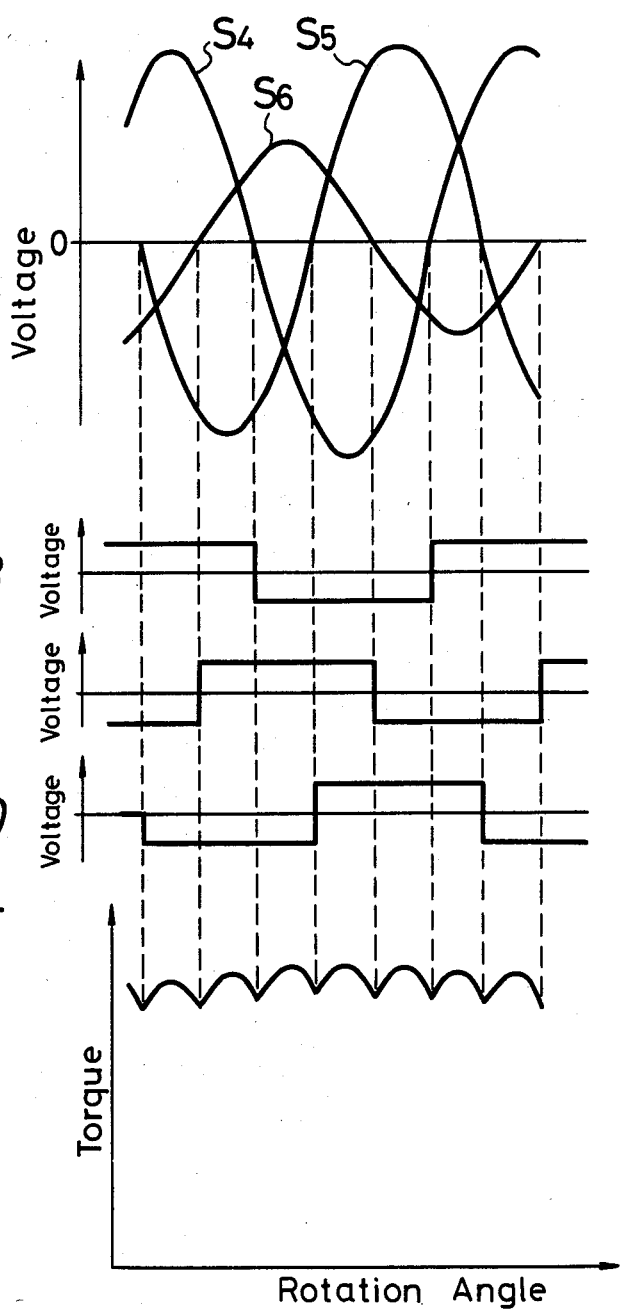

In this case, according to this embodiment, when the rotor 2 is rotated, the waveforms of the output signals from the Hall elements $H_1$ and $H_2$ are not saturated and become relatively steep waveforms as shown by curves $S_4$ and $S_5$ in FIG. 9A because of the auxiliary magnetic poles 2b of opposite polarities to those of the main magnetic poles 2a provided on the portions of the rotor 2 near and opposing to the Hall elements $H_1$ and $H_2$. A waveform $S_6$ of the composed signal c formed on the basis of the waveforms $S_4$ and $S_5$ becomes relatively steep at zero-cross points as shown in FIG. 9A and hence the zero-cross points are determined. As a result, the composed signal c as shown in FIG. 9C is supplied between the fifth and six input terminals of the control signal generating circuit 6. In the composed signal c as shown in FIG. 9C, the rising edge and the falling edge of its square wave are determined by the zero-cross points of the waveform $S_6$. FIGS. 9B and 9D respectively show the waveforms provided from the output signals $S_4$ and $S_5$ of the Hall elements $H_1$ and $H_2$. When the signals as shown in FIGS. 9B, 9C and 9D are supplied to the input terminals of the control signal generating circuit 6 which then produces the drive currents to be supplied to the stator coils $L_1, L_2 \ldots L_6$ and the rotor 2 is rotated by the above drive currents, its uneven rotation torque becomes relatively small as shown in FIG. 9E and a ripple can be reduced to, for example, 6.37%.

Figure 10:
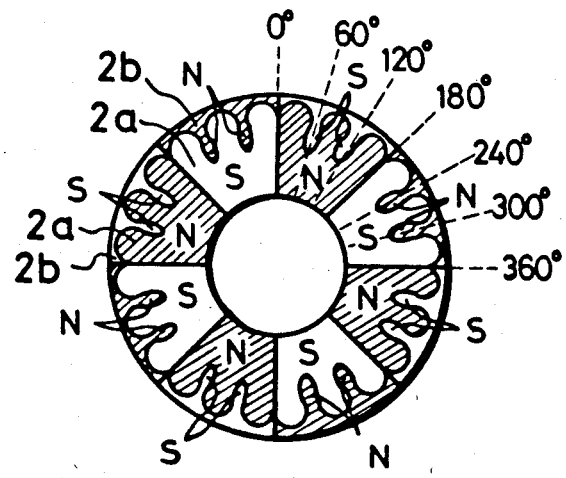
FIGS. 10 and 12 are respectively plan views showing examples of rotors used in other embodiments of the present invention.
Figure 11A:
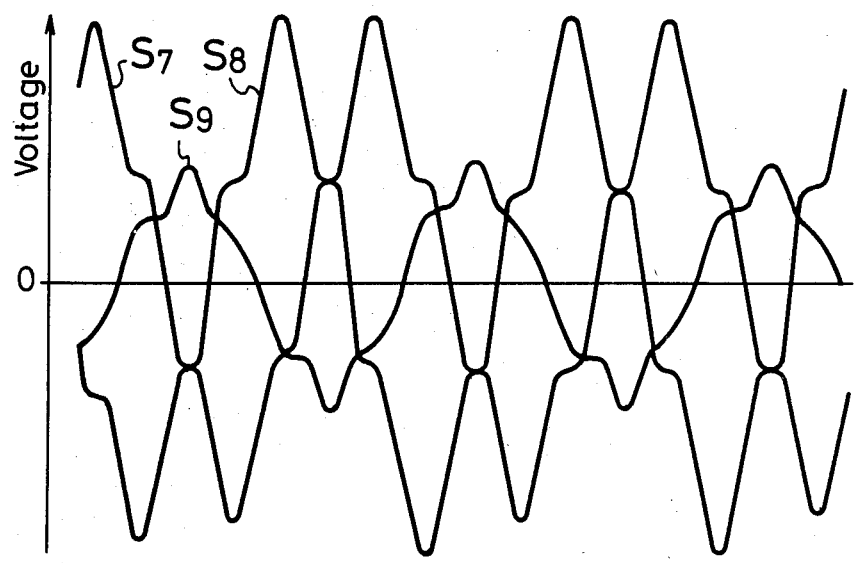
Figure 11B:
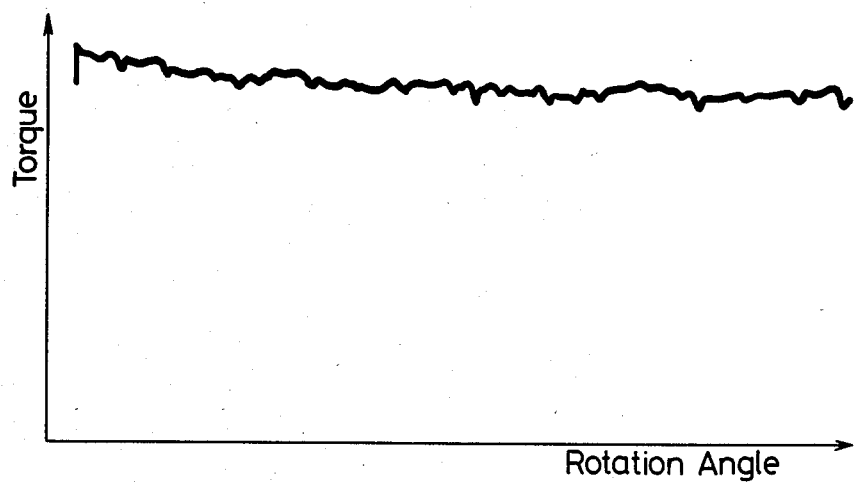

Further, FIG. 10 shows another embodiment of the rotor 2 according to the present invention. In the embodiment of FIG. 10, two auxiliary magnetic poles 2b of island shape having opposite polarities to those of the main magnetic poles 2a are symmetrically disposed near the external peripheries of the main magnetic poles 2a. In this case, the auxiliary magnetic poles 2b of island shape are respectively provided to have electrical angles of substantially 60°, 120°, 240° and 300° as shown in FIG. 10. When the stator for this rotor is constructed similarly as above, the waveforms of the output signals from the Hall elements $H_1$ and $H_2$ become as shown by curves $S_7$ and $S_8$ in FIG. 11A. Since a waveform $S_9$ of the composed signal provided by composing the curves $S_7$ and $S_8$ becomes steep at zero-cross points of the composed signal, the waveform of the composed signal becomes steep at the zero-cross points as shown by the curve $S_9$ in FIG. 11A. Thus, the zero-cross points are determined accurately so that the excellent drive currents Ia, Ib and Ic can be supplied to the stator coils $L_1, L_2 \ldots L_6$, thus the uneven rotation torque being made extremely small as shown in FIG. 11B.

Figure 12:
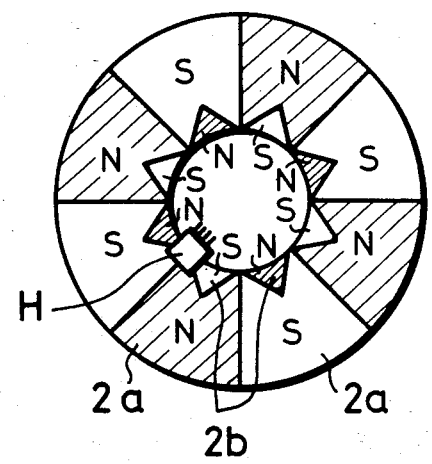
Figure 13A:
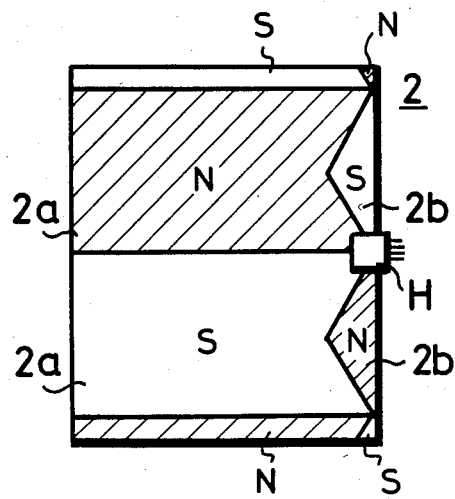
FIGS. 13A and 13B are diagrams showing an example of a rotor in a case wherein the present invention is applied to a cylindrical type motor.
Figure 13B:
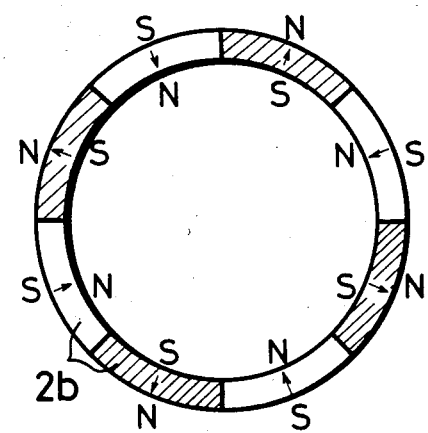

FIG. 12 shows a further embodiment of the present invention, and in the embodiment of FIG. 12, the auxiliary magnetic poles 2b of the rotor 2 are respectively disposed at the inside of the main magnetic poles 2a. In this case, the Hall elements $H_1$ and $H_2$ of the stator are disposed so as to correspond to the auxiliary magnetic poles 2b, too. It is needless to say that by the embodiment shown in FIG. 12, similar action and effect as above can be achieved. Further, when the present invention is applied to a motor of cylindrical type, the rotor thereof is constructed as shown in FIGS. 13A and 13B, in which the auxiliary magnetic poles 2b are disposed on the end surface of the rotor. According to the embodiment shown in FIG. 13, similar action and effect as above can be of course achieved.

Also it is needless to say that instead of the Hall element in the above embodiments, other electromagnetic transducer element such as magnetoresistance element and so on can be used. Furthermore, while in the above embodiments the two electromagnetic transducer elements are disposed to have an electrical angular spacing of 240° therebetween, it will be easily understood that they can be disposed to have an electrical angular spacing of 120°. In addition, it is needless to say that the present invention is not limited to the above embodiments but can take various modifications without departing from the gist of the present invention.

We claim:

1. A three-phase brushless motor in which two electromagnetic transducer elements to detect a rotation position of a rotor having a plurality of magnetized areas are disposed to have a relative positional relation with an electrical angle of 120° or 240° therebetween, respective output signals from said electromagnetic transducer elements are composed to produce a composed signal having a phase difference of 120° relative to said output signals from said electromagnetic transducer elements, and said composed signal and said output signals from said electromagnetic transducer elements are used to determine a drive current which is supplied to a stator coil, characterized in that an auxiliary magnetic pole having opposite polarity to that of a main magnetic pole is provided on said rotor at a portion near and opposing to said electromagnetic transducer elements whereby a waveform of said composed signal of said output signals from said electromagnetic transducer elements is made steep at zero-cross points.

2. A three-phase brushless motor according to claim 1, characterized in that a magnetic pole of each magnetized area of said rotor at a portion opposing to said stator coil is an N(S) pole and a portion of said magnetized area opposing to said electromagnetic transducer elements is formed of an N(S) pole of narrow width and auxiliary magnetic S(N) pole portions disposed at both sides of said narrow magnetic pole.

3. A three-phase brushless motor according to claim 2, characterized in that said stator coil is formed of 6 coils and said rotor is formed of 8 magnetized areas.

4. A three-phase brushless motor according to claim 3, characterized in that said stator coils are formed of 3 pairs of circuits, each pair of which are serially coupled to each other and a drive circuit is provided to supply to each of said 3 pairs of circuits currents flowing in the different directions.

5. A three-phase brushless motor according to claim 4, characterized in that said electromagnetic transducer elements are Hall elements, each of said Hall elements having two output terminals and circuits, each formed of two resistors serially coupled to each other, are connected between output terminals of different Hall elements, whereby a composed signal is derived from a connection point between said resistors serially coupled to each other.

6. A three-phase brushless motor according to claim 5, characterized in that an S(N) pole portion of island shape is provided on a part of the N(S) pole portion of each magnetized areas opposing to the stator coil and corresponding to electrical angles of substantially 60°, 120°, 240° and 300°.

7. A three-phase brushless motor according to claim 6, characterized in that said S(N) pole portion of island shape is coupled to auxiliary magnetic pole at the portion opposing to said electromagnetic transducer elements.

* * * * *